United States Patent [19]
Saito et al.

[11] Patent Number: 6,097,259
[45] Date of Patent: Aug. 1, 2000

[54] MODULATOR AND MODULATION METHOD FOR ORTHOGONALLY MODULATING DIGITAL BASEBAND SIGNALS

[76] Inventors: Yoshiko Saito, 301 Sezon-YT, 4-3-20, Ikeda-cho, Yokosuka-shi, Kanagawa, 239-0806; Mitsuru Uesugi, 1F Haitsu-Otsuka, 3-14-6, Kurihama, Yokosuka-shi, Kanagawa-shi, 239-0831, both of Japan

[21] Appl. No.: 09/147,053

[22] PCT Filed: Feb. 17, 1998

[86] PCT No.: PCT/JP98/00657

§ 371 Date: Sep. 28, 1998

§ 102(e) Date: Sep. 28, 1998

[87] PCT Pub. No.: WO98/38775

PCT Pub. Date: Sep. 3, 1998

[30] Foreign Application Priority Data

Feb. 27, 1997 [JP] Japan ........................ 9-58605

[51] Int. Cl.$^7$ .................................................. H04L 27/36
[52] U.S. Cl. .................. 332/103; 375/271; 375/298; 375/302
[58] Field of Search .................... 332/103, 104, 332/105; 375/271, 298, 302

[56] References Cited

U.S. PATENT DOCUMENTS

| | | | |
|---|---|---|---|
| 5,530,722 | 6/1996 | Dent | 332/103 |
| 5,534,827 | 7/1996 | Yamaji | 332/103 |
| 5,714,916 | 2/1998 | Yamaji | 332/103 |

FOREIGN PATENT DOCUMENTS

| | | |
|---|---|---|
| 19654585 | 7/1997 | Germany. |
| 6-21991 | 1/1994 | Japan. |
| 8149169 | 6/1996 | Japan. |
| 9186728 | 7/1997 | Japan. |

*Primary Examiner*—Siegfried H. Grimm

[57] ABSTRACT

A modulator and modulation method for orthogonally modulating digital baseband signals include interpolation filters that frequency convert the frequencies of an in-phase component and a quadrature phase component of a digital baseband signal to four times the frequency of an intermediate frequency. ΔΣ modulation circuits are provided and ΔΣ modulate the frequency converted signals. A low pass filter is provided to remove unnecessary components from the ΔΣ modulated signals. A switching circuit selects a signal that has passed through the low pass filter according to an order of an in-phase component, a code inverted component of a quadrature phase component, a code inverted component of the in-phase component and the quadrature phase component, and outputs these signals as a digital orthogonal signal. An N bit D/A converter converts the digital orthogonal signals into analog orthogonal signals.

18 Claims, 7 Drawing Sheets

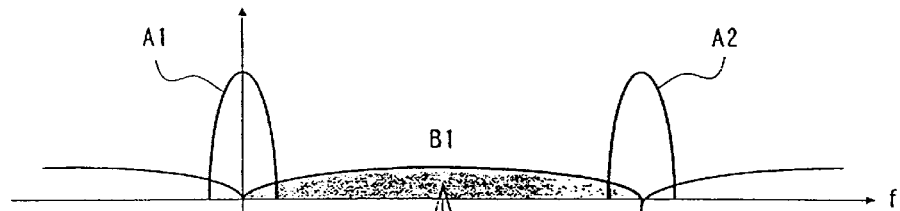
FIG. 4 (a)
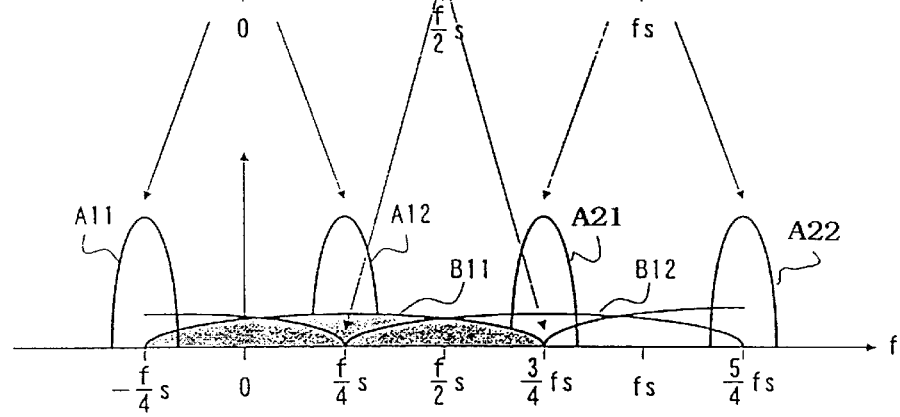
FIG. 4 (b)
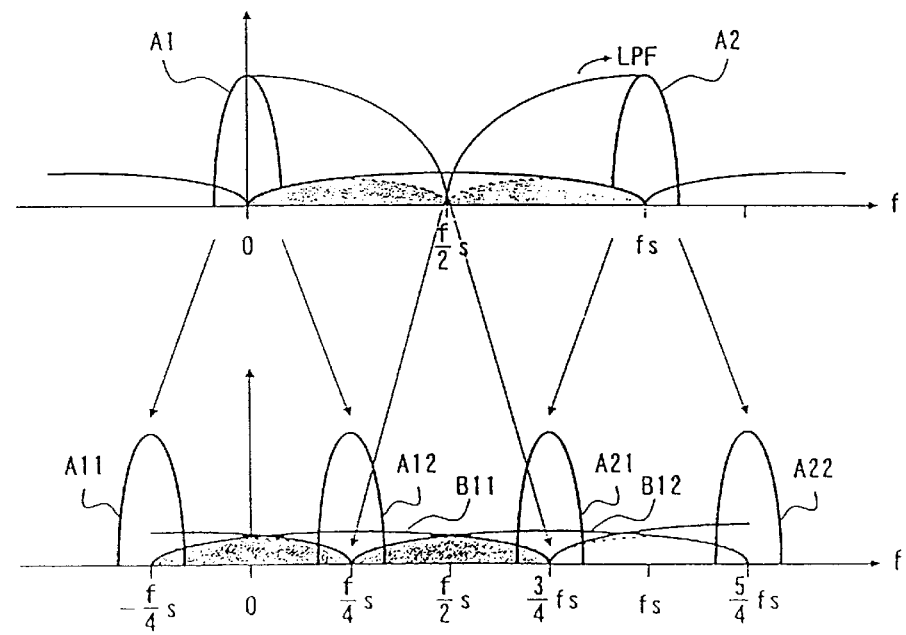
FIG. 4 (c)
FIG. 4 (d)

MODULATOR AND MODULATION METHOD FOR ORTHOGONALLY MODULATING DIGITAL BASEBAND SIGNALS

BACKGROUND OF THE INVENTION

1. Field of the Invention

The present invention relates to a modulation apparatus and a modulation method for orthogonally modulating a digital baseband signal, such as is utilized in a digital mobile communication and other communication system.

2. Discussion of Background Information

In a digital mobile communication system such as portable telephone, as disclosed in Japanese Unexamined Patent Publication No. 6-21991, a modulator is utilized. The modulator divides a transmitted signal into an in-phase component and a quadrature phase component, $\Delta\Sigma$ modulates each component then orthogonal modulates each component.

In the following description, a conventional modulator is explained with respect to the drawings. FIG. 1 is a block diagram illustrating a configuration of a conventional modulator.

In FIG. 1, $\Delta\Sigma$ modulator 2 converts a modulated signal input from input terminal 1 into a binary signal and outputs it to a multiplying circuit 3. Multiplying circuit 3 generates an amplitude modulated signal by multiplying the binary signal output from $\Delta\Sigma$ modulator 2 by a carrier signal and outputs the multiplied signal to output terminal 4.

Next, the operations of a conventional modulator having the above configuration are explained.

First a modulated signal input from input terminal 1 is $\Delta\Sigma$ modulated at $\Delta\Sigma$ modulator 2, then a binary $\Delta\Sigma$ modulated signal is output. Then an amplitude modulated signal is generated by multiplying the $\Delta\Sigma$ modulated signal by a carrier signal, which is output to another apparatus, via output terminal 4. As described above, a conventional modulator modulates a transmission signal into a digital orthogonal signal.

However in the conventional modulator as described above, a multiplication process is necessary for an orthogonal modulation under a high sampling frequency that is not avoidable to process the $\Delta\Sigma$ modulation. Because this requires a high-rate multiplier, the conventional modulator has a problem in that the consumed electric power becomes high.

SUMMARY OF THE INVENTION

It is thus an object of the present invention to provide a modulator without requiring a high-rate multiplier to make electric power consumption low.

According to the present invention, this object is achieved by utilizing a modulator for setting a center frequency of a digital baseband signal at four times the frequency of an intermediate frequency to $\Delta\Sigma$ modulate, and switching, at a switching circuit, an output signal of a $\Delta\Sigma$ modulation circuit and its code inverted signal at a sampling frequency of four times the frequency of an intermediate frequency to select.

This object is achieved by a modulator that arbitrarily sets a center frequency of a digital baseband signal to $\Delta\Sigma$ modulate the signal and selecting a carrier signal according to an output signal from a $\Delta\Sigma$ modulation circuit.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4(a)–4(d) are wave diagrams illustrating the relation of signal and noise at a modulator in the second embodiment of the present invention;

DETAILED DESCRIPTION OF THE PRESENT INVENTION

First Embodiment

In the first embodiment of the present invention, an explanation is given of a modulator for an orthogonal modulation which increases the center frequency of a digital baseband signal to four times the frequency of an intermediate frequency to $\Delta\Sigma$ modulate the signal, and then selects the signal and its code converted signal at a switching circuit by switching at a sampling frequency that is four times the frequency of the intermediate frequency.

Figure 1:
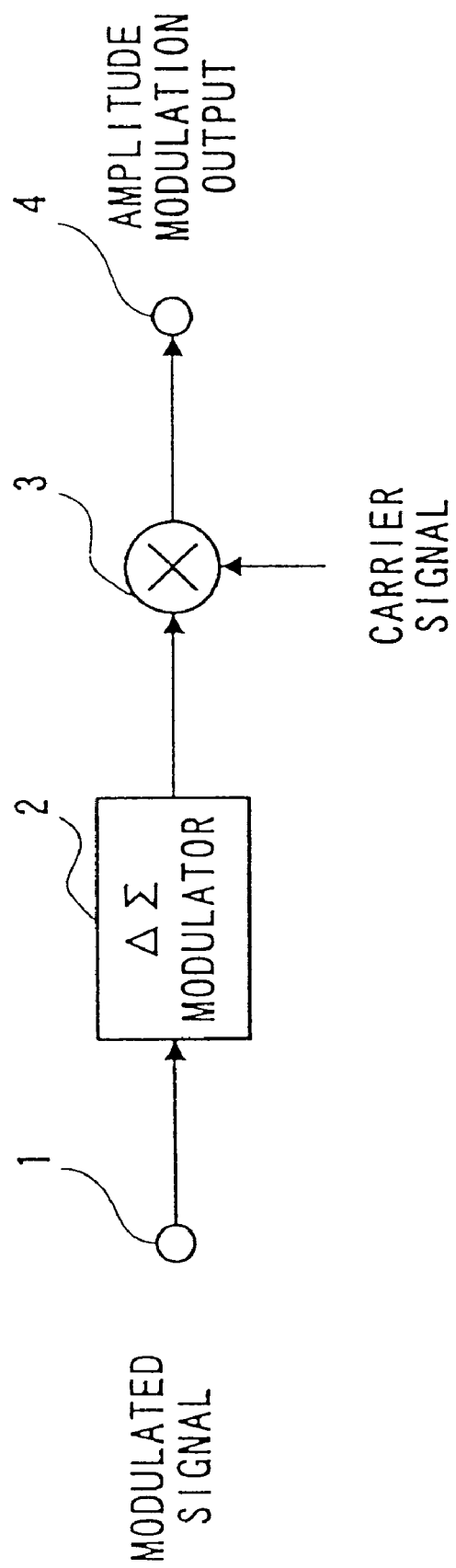
FIG. 1 is a block diagram illustrating a configuration of a conventional modulator.
Figure 2:
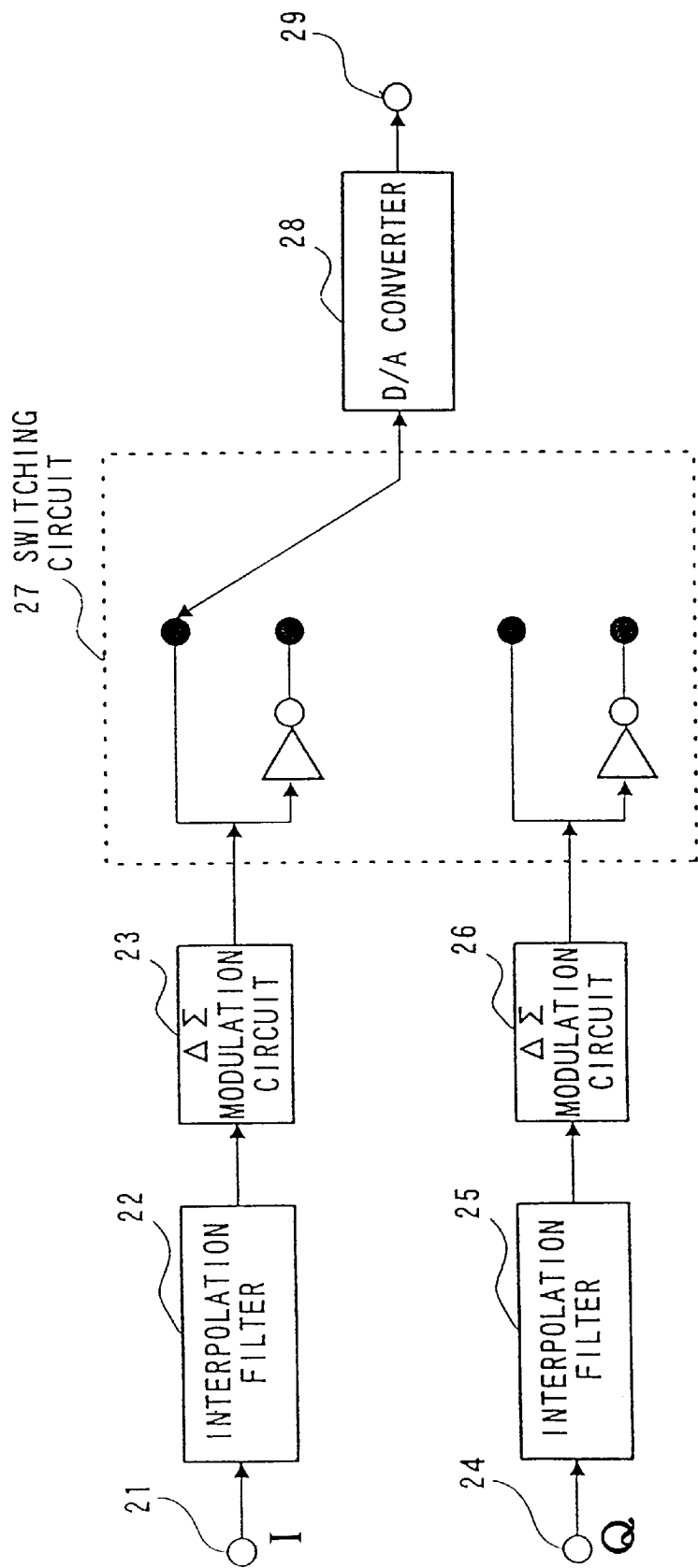
FIG. 2 is a block diagram illustrating a configuration of a modulator according to a first embodiment of the present invention.

FIG. 2 is a block diagram illustrating a configuration of a modulator according to the first embodiment of the present invention. In the apparatus, in the case of transmitting a signal by radio, a carrier wave of high frequency is multiplied by a digital baseband signal after its center frequency is increased at a certain intermediate frequency.

Interpolation filter 22 increases a center frequency of an in-phase component (abbreviated as "I signal" in the following description) of a digital baseband signal inputted from input terminal 21 to four times the frequency of an intermediate frequency, then outputs the signal with the increased frequency to $\Delta\Sigma$ modulation circuit 23. In a similar manner, interpolation filter 25 increases a center frequency of a quadrature phase component (abbreviated as "Q signal" in the following description) of a digital baseband signal inputted from input terminal 24 to four times the frequency of an intermediate frequency, then outputs the signal with the increased frequency to $\Delta\Sigma$ modulation circuit 26.

$\Delta\Sigma$ modulation circuit 23 converts the I signal input from interpolation filter 22 into a binary signal by $\Delta\Sigma$ modulating the signal, then outputs the converted signal to switching circuit 27. In the similar manner, $\Delta\Sigma$ modulation circuit 26 converts the Q signal input from interpolation filter 25 into a binary signal by $\Delta\Sigma$ modulating the signal, then outputs the converted signal to switching circuit 27.

Switching circuit 27 generates code converted signals from the $\Delta\Sigma$ modulated I signal and Q signal (abbreviated as "nI signal" and "nQ signal" in the following description), executes an orthogonal conversion by selecting the four types of signals (I signal, Q signal, nI signal and nQ signal)

at a sampling period of a fourth the period of an intermediate period according to the order of the I signal, the nQ signal, the nI signal, and the Q signal, then outputs the obtained digital orthogonal signal with the intermediate frequency to D/A converter 28.

D/A converter 28 converts the digital orthogonal signals input from switching circuit 27 into analogue orthogonal signals and outputs the converted analogue orthogonal signals to another apparatus via output terminal 29.

Next, orthogonal modulation processing at a modulator according to the first embodiment of the present invention will be explained in detail.

Orthogonal modulated wave s(t) with an intermediate frequency is represented by the following relationship (1), where the I signal component is i(t), the Q signal component is q(t) and an intermediate frequency is f0.

$$s(t)=i(t)\times\cos(2\pi f0t)-q(t)\times\sin(2\pi f0t) \quad (1)$$

Because sampling frequency fs is set at four times the frequency of the intermediate frequency f 0, the above relationship (1) can be transformed into the following relationship:

$$s(t)=i(t)\times\cos(2\pi fst/4)-q(t)\times\sin(2\pi fst/4) \quad (2)$$

Now, the orthogonal modulated wave s(t) is equivalent to a digital orthogonal signal outputted by sampling at a sampling period of Ts=1/fs. Therefore, the relationship (2) can be transformed into the following relationships (3)–(6), where n is an integer.

$$s(t)=i(t)(t=4n\text{ Ts}) \quad (3)$$

$$s(t)=-q(t)(t=(4n+1)\text{Ts}) \quad (4)$$

$$s(t)=-i(t)(t=(4n+2)\text{Ts}) \quad (5)$$

$$s(t)=q(t)(t=(4n+3)\text{Ts}) \quad (6)$$

That is, the orthogonal modulation can be achieved for switching circuit 27 to sequentially select a signal according to the order of I signal, nQ signal, nI signal and Q signal at a sampling period Ts.

Next, a flow of the operations at a modulator according to the first embodiment of the present invention will be explained.

First a center frequency of an I signal input to input terminal 21 is increased to four times the frequency of an intermediate frequency at interpolation filter 22 and the signal is ΔΣ modulated at ΔΣ modulation circuit 23. In a similar manner, a center frequency of a Q signal input to input terminal 24 is increased to four times the frequency of an intermediate frequency at interpolation filter 25 and the signal is ΔΣ modulated at ΔΣ modulation circuit 26.

Next, switching circuit 27 generates code converted signals. An nI signal and an nQ signal are generated from the ΔΣ modulated I signal and Q signal. Switching circuit 27 further sequentially selects a signal according to the order of I signal, nQ signal, nI signal and Q signal at a sampling period of a fourth the period of an intermediate period and outputs the orthogonally modulated digital signal at an intermediate frequency.

Next, at D/A converter 28, the digital orthogonal signal is converted into an analogue orthogonal signal and the converted analogue signal is output to another apparatus via output terminal 29.

As described above, at the modulator in the embodiment of the present invention, the orthogonal modulation is processed at the switching circuit. Thus, the calculation scale in this case is reduced to be much less than the case of using a high-rate multiplier, which allows a decrease in the consumed electric power.

Second Embodiment

In the second embodiment of the present invention, an explanation is given of a modulator for an orthogonal modulation which increases the center frequency of a digital baseband signal to four times the frequency of an intermediate frequency to ΔΣ modulate the signal, passes the ΔΣ modulated signal through a low pass filter (hereinafter "LPF"), then selects the signal and its code converted signal at a switching circuit by switching at a sampling frequency that is four times the frequency of an intermediate frequency.

Figure 3:
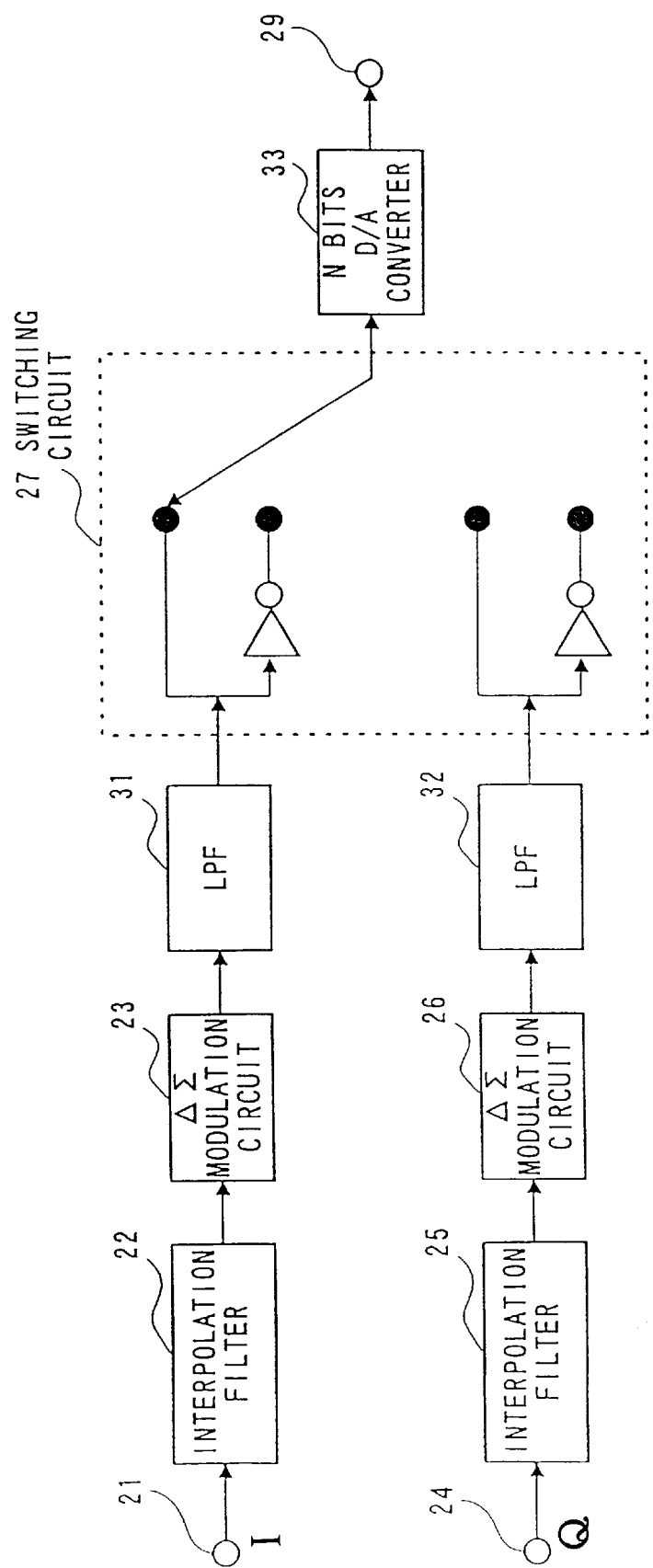
FIG. 3 is a block diagram illustrating a configuration of a modulator according to a second embodiment of the present invention.

FIG. 3 is a block diagram illustrating a configuration of a modulator according to the second embodiment of the present invention. In addition, the parts common to FIG. 2 have the same symbols as utilized in FIG. 2 so that an explanation of these parts is omitted.

As illustrated in FIG.3, the differences between the modulator of the first embodiment of the present invention and the modulator of the second embodiment of the present invention are LPF 31, which is inserted between ΔΣ modulation circuit 23 and switching circuit 27, and LPF 32, which is inserted between ΔΣ modulation circuit 26 and switching circuit 27.

LPF 31 is a low pass filter with frequency characteristics having a notch at a half the frequency of a sampling frequency and removes an unnecessary component such as quantization noise and so on at around half the frequency of the sampling frequency. Similar to LPF 31, LPF 32 is a low pass filter with frequency characteristics having a notch at half the frequency of a sampling frequency and removes an unnecessary component such as quantization noise and so on at around a half the frequency of the sampling frequency.

Switching circuit 27 generates an nI signal from an I signal passed through LPF 31, generates an nQ signal from a Q signal passed through LPF 32, performs an orthogonal modulation by selecting a signal according to the order of I signal, nQ signal, nI signal and nQ signal at the sampling period with a fourth the period of a an intermediate period, and outputs a digital orthogonal signal at the intermediate frequency. N bits D/A converter 34 converts a digital orthogonal signal output from switching circuit 27 into an analogue orthogonal signal, and outputs the converted analogue signal to another apparatus via output terminal 29.

Next the relation of signal and noise at a modulator in the second embodiment of the present invention is explained with reference to wave diagrams in FIGS. 4(a)–4(d). In addition, in the second embodiment of the present invention, an I signal is explained, however a Q signal is also explained in the similar manner.

FIG. 4(a) is a waveform diagram illustrating a waveform of an I signal before passing through an LPF, and FIG. 4(b) is a waveform diagram of a waveform of the signal when an I signal not passing through an LPF is orthogonal modulated. FIG. 4(c) is a waveform diagram illustrating a waveform of an I signal after passing through LPF, and FIG. 4(d) is a waveform diagram of a waveform of the signal when an I signal, passed through LPF is orthogonal modulated.

As illustrated in FIG. 4(a), the ΔΣ modulation outputs of I signal (A1 and A2) have peaks at the intervals of sampling period fs. Quantization noise included in ΔΣ modulation outputs (B1) have frequency characteristics with a peak at half the frequency of sampling frequency fs according to the noise-shaving characteristic of a ΔΣ modulation system.

Further, as illustrated in FIG. 4(b), when the ΔΣ modulation outputs (A1 and A2) of I signal are orthogonal modulated at the intermediate frequency which center frequency is a fourth the frequency of the sampling frequency, the peaks of digital orthogonal signals (A11, A12, A21 and A22) appear at a position shifted by the amount of the intermediate frequency (f0=fs/4) from the peak position of the ΔΣ modulation outputs (A1 and A2) of I signal.

On the other hand, when the quantization noise (BI) is orthogonal modulated at the intermediate frequency which center frequency is a fourth the frequency of the sampling frequency, the peaks of the orthogonal modulated quantization noises (B11, B12) appear at fs/2-f0=fs/2-fs=fs/4. At this time, the peaks of the shifted digital orthogonal signals (A11, A12, A21, A22) and the peaks of the quantization noises (B11, B12) overlap. This results in a decrease in the S/N ratio (signal to noise ratio), which prevents a high precision modulation.

On the contrary, as illustrated in FIG. 4(c), by passing the ΔΣ modulation outputs (A1 and A2) through the LPF having the characteristics to generate a notch at half the frequency of a sampling frequency, the quantization noise is partially removed and the influence of quantization noise (B1) at half the frequency of sampling frequency fs is decreased.

In the manner described above, as illustrated in FIG. 4 (d), in the case of orthogonal modulating quantization noise (B1) at the intermediate frequency which center frequency is a fourth the frequency of a sampling frequency, the quantization noises (B11, B12) are decreased at the intermediate frequency f0=fs/4 that is the shifted peak positions of the digital orthogonal signals (A11, A12, A21, A22). This allows improvement in the S/N ratio and results in a high precision modulation.

Specifically, in the phase precision in experimental trial using the above embodiment of the present invention, the average value is less than 1.14° and the maximum value is 3.33° while the average value is less than 5° and the maximum value is 20° in the phase precision in the specification of GMS (Global Systems for Mobile communication). In addition, this experimental result is just an example under one set of conditions, and the better results are expected under other conditions.

Next a flow of the operations at a modulator in the second embodiment of the present invention will be explained.

First, a center frequency of an I signal inputted to input terminal 21 is increased to four times the frequency of an intermediate frequency at interpolation filter 22. Then, the signal is ΔΣ modulated at ΔΣ modulation circuit 23, and the unnecessary frequency component is removed at LPF 31. In a similar manner, an intermediate frequency of a Q signal inputted to input terminal 24 is increased to four times the frequency of an intermediate frequency at interpolation filter 25. Then, the signal is ΔΣ modulated at ΔΣ modulation circuit 26 and the unnecessary frequency component is removed at LPF 32.

Next at switching circuit 27, an I signal and a Q signal, from which the unnecessary frequency components have been removed, and their code converted signals, a nI signal and a nQ signal are generated. These signals are selected sequentially according to the order of I signal, nQ signal, nI signal and Q signal at the sampling period of a fourth the period of the intermediate frequency, and the digital orthogonal modulated signals at the intermediate frequency are output.

Next the digital orthogonal signals are converted into analogue orthogonal signals at D/A converter 33, and the converted analogue orthogonal signals are outputted to another apparatus via output terminal 29.

In the manner described above, at a modulator according to the second embodiment of the present invention, by passing the ΔΣ modulation outputs of the I signal and the Q signal through the LPF, since the S/N ratio can be improved by decreasing the influence of the quantization noise during orthogonal modulation, high precision modulation can be achieved.

Third Embodiment

In the third embodiment of the present invention, an explanation will be given of a modulator for an orthogonal modulation which ΔΣ modulates a digital baseband signal after increasing its center frequency at four times the frequency of an intermediate frequency, selects the signal, its code converted signal and its delayed signal at a switching circuit by switching at a sampling frequency having four times the frequency of an intermediate frequency and adds those signals.

Figure 5:
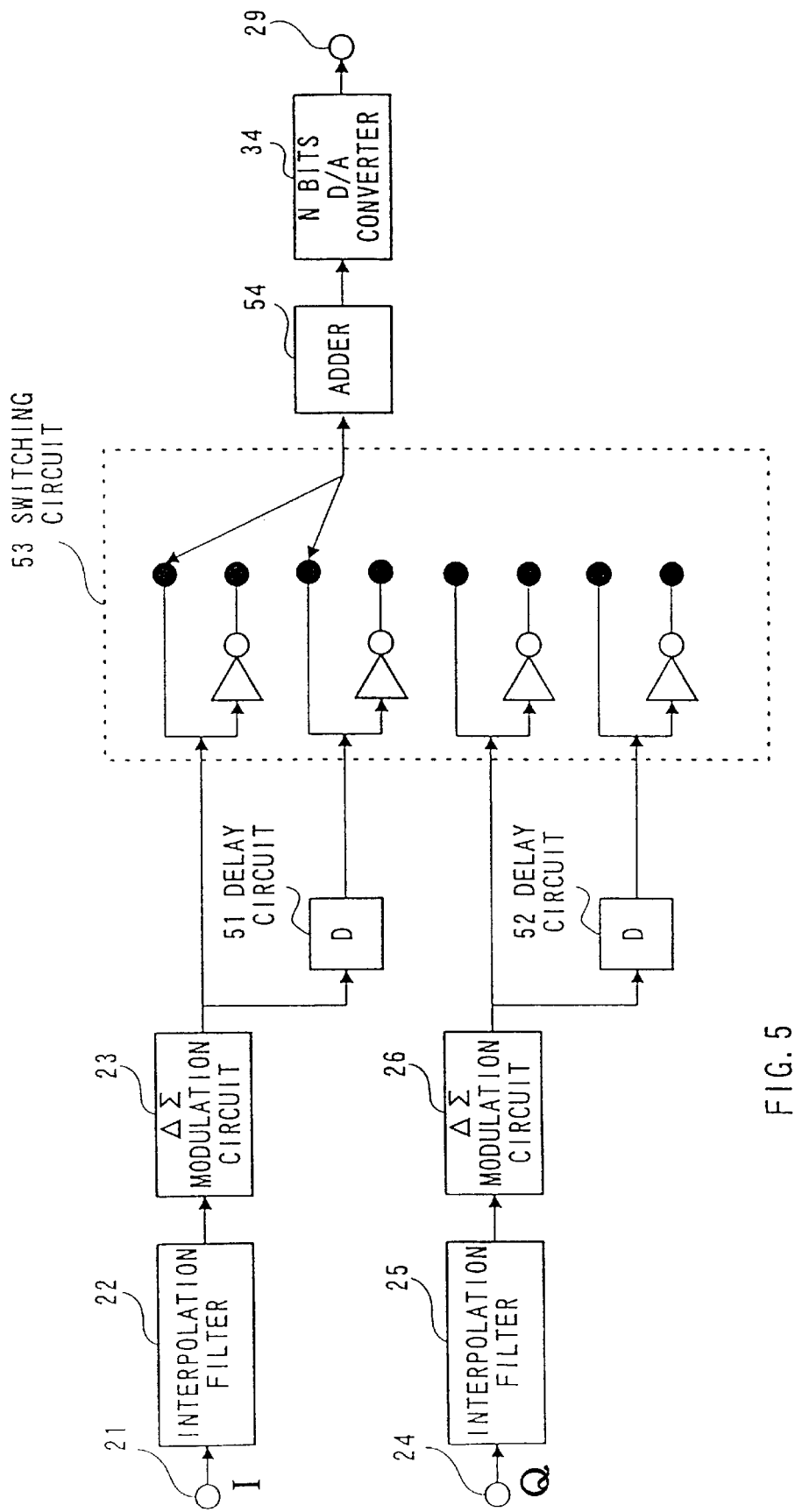
FIG. 5 is a block diagram illustrating a configuration of a modulator according to a third embodiment of the present invention.

FIG. 5 is a block diagram illustrating a configuration of a modulator according to the third embodiment of the present invention. In addition, parts common to the embodiment of FIG. 3 have the same symbols as in FIG. 3 and the explanation of these common parts is thus omitted.

Delay circuit 51 delays the sampling time for the ΔΣ modulated I signal by one sampling time (i.e., period) and outputs the delayed I signal to switching circuit 53. In a similar manner, delay circuit 52 delays the sampling time for the ΔΣ modulated Q signal by one sampling time (i.e., period) and outputs the delayed Q signal to switching circuit 53.

Switching circuit 53 generates a ni signal and nQ signal respectively from the I signal passed through ΔΣ modulation circuit 23 and the Q signal passed through ΔΣ modulation circuit 26, and generates a delayed nI signal and a delayed nQ signal respectively from the delayed I signal passed through delay circuit 51 and a delayed Q signal passed through delay circuit 52. Circuit 53 also selects a pair of two types of signals from the eight types of signals at the sampling period of a fourth the period of an intermediate period according to the order of a pair of I signal and delayed I signal, a pair of nQ signal and delayed nQ signal, nI signal and delayed nI signal and Q signal and delayed Q signal, and outputs them to adder 54.

Adder 54 adds a pair of signals concurrently outputted from switching circuit 53, generates a digital orthogonal signal at the intermediate frequency and outputs the digital orthogonal signal to N bits D/A converter 34.

As a digital orthogonal signal s(t) outputted from adder 54, s(t) according to relationships (7) to (10) are as follows:

$$s(t)=i(t)-i(t-1)(t=4nTs) \quad (7)$$

$$s(t)=-q(t)+q(t-1)(t=(4n+1)Ts) \quad (8)$$

$$s(t)=-i(t)+i(t-1)(t=(4n+2)Ts) \quad (9)$$

$$s(t)=q(t)-q(t-1)(t=(4n+3)Ts) \quad (10)$$

The digital orthogonal signal s(t) results when the frequency characteristics of LPF 31 and LPF 32 are the primary functions in the second embodiment of the present invention, and is the same signal as the digital orthogonal signal orthogonally modulated by switching circuit 27.

By the configuration described above, compared to the case of using LPF, downsizing of the modulator can be achieved while the influence of quantization noise can be decreased.

Fourth embodiment

In the fourth embodiment of the present invention, an explanation is given of a modulator for an orthogonal modulation in which one bit ΔΣ modulates a digital baseband signal after the sampling frequency is increased to a desired one, and code processing a carrier wave corresponding to the output value of one bit ΔΣ modulation is added. In this case, the one bit ΔΣ modulation refers to the case where the output value of ΔΣ modulation is one bit.

Figure 6:
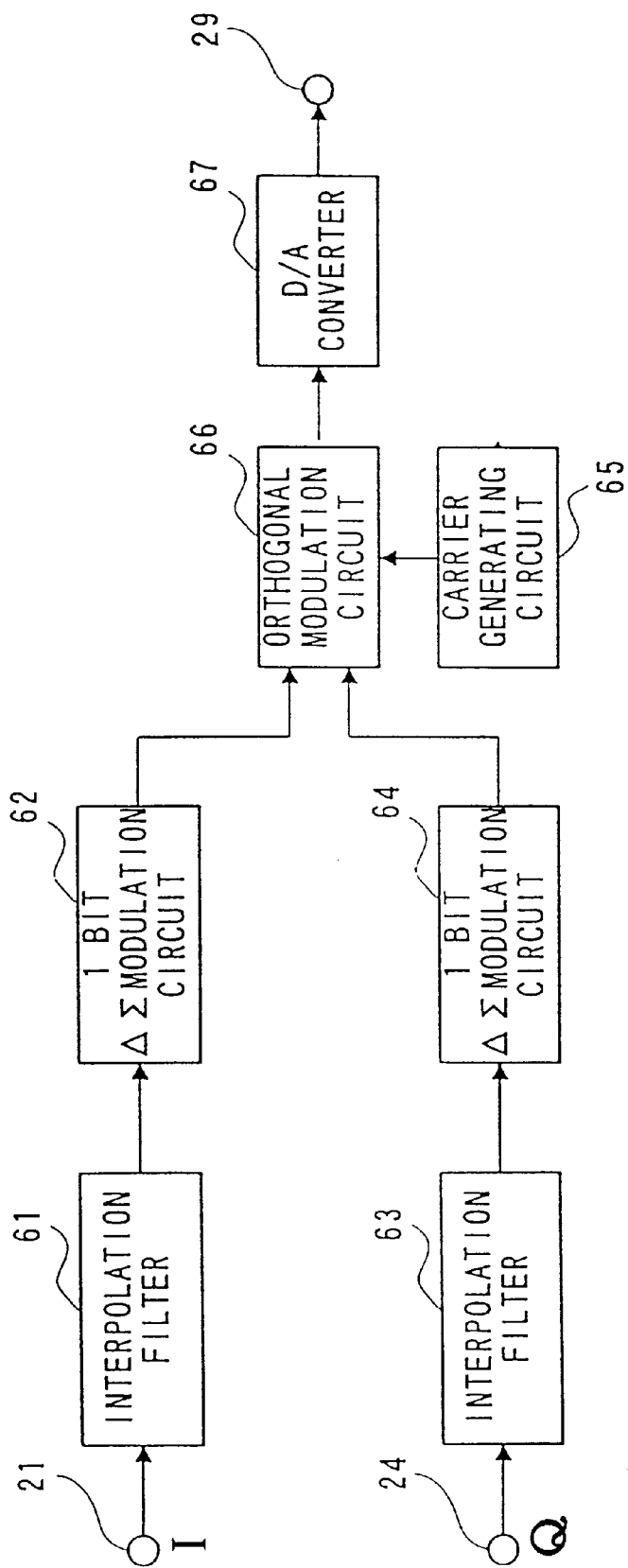
FIG. 6 is a block diagram illustrating a configuration of a modulator according to a fourth embodiment of the present invention.

FIG. 6 is a block diagram illustrating a configuration of a modulator according to the fourth embodiment of the present invention.

In FIG. 6, interpolation filter 61 increases the frequency of an I signal input from input terminal 21 to a desired sampling frequency fs. In a similar manner, interpolation filter 63 increases the frequency of a Q signal input from input terminal 21 to a desired sampling frequency fs.

One bit ΔΣ modulation circuit 62 one bit ΔΣ modulates an I signal input from interpolation filter 61, and outputs the one bit ΔΣ modulated I signal to orthogonal modulation circuit 66. In a similar manner, one bit ΔΣ modulation circuit 64 one bit ΔΣ modulates a Q signal input from interpolation filter 63, and outputs the one bit ΔΣ modulated Q signal to orthogonal modulation circuit 66. Carrier generating circuit 65 generates a cosine carrier and a sine carrier to transmit a signal by radio, and outputs the carriers to orthogonal modulation circuit 66.

Orthogonal modulation circuit 66 processes the coding for the cosine carrier and the sine carrier input from carrier generating circuit 65 corresponding to the values of the one bit ΔΣ modulated I signal and Q signal. Then orthogonal modulation circuit 66 adds the coded cosine carrier and the coded sine carrier to orthogonal modulate, and outputs the digital orthogonal signals to D/A converter 67.

Herein, since component i(t) of one bit ΔΣ modulated I signal and component q(t) of one bit ΔΣ modulated Q signal are both either 1 or both −1, digital orthogonal signal s(t) can be represented by the following relationships (11)–(14), where n is an integer and t=nTs=n/fs.

$$s(t)=\cos(2\pi f0/fs)-\sin(2\pi f0/fs)(i(t)=1, q(t)=1) \quad (11)$$

$$s(t)=\cos(2\pi f0/fs)+\sin(2\pi f0/fs)(i(t)=1, q(t)=-1) \quad (12)$$

$$s(t)=-\cos(2\pi f0/fs)-\sin(2\pi f0/fs)(i(t)=-1, q(t)=1) \quad (13)$$

$$s(t)=-\cos(2\pi f0/fs)+\sin(2\pi f0/fs)(i(t)=-1, q(t)=-1) \quad (14)$$

As described above, a signal of the cosine carrier is retained when i(t)=1, while a signal of the cosine carrier is inverted when i(t)=−1. Similarly, a signal of the sine carrier is retained when q(t)=−1, while a signal of the sine carrier is inverted when q(t)=−1. Thus, a digital orthogonal signal is obtained by adding these coded cosine carriers and coded sine carriers.

D/A converter 67 converts a digital orthogonal signal into an analogue orthogonal signal, and outputs the converted analogue signal to another apparatus via output terminal 29.

Next, a flow of operations at a modulator in the fourth embodiment of the present invention will be explained.

First, the frequency of an I signal input to input terminal 21 is increased to a desired frequency at interpolating filter 61, then the signal is one bit ΔΣ modulated at one bit ΔΣ modulation circuit 62. In a similar manner, the frequency of an Q signal input to input terminal 24 is increased to a desired frequency at interpolating filter 63, then the signal is one bit modulated at one bit ΔΣ modulation circuit 64.

Next, at orthogonal modulation circuit 66, a signal of the cosine carrier that is input from carrier generating circuit 65 is retained when the one bit ΔΣ modulation I signal is 1, and a signal of the cosine carrier is inverted when the one bit ΔΣ modulation I signal is −1. In a similar manner, a signal of the sine carrier that is input from carrier generating circuit 65 is retained when the one bit ΔΣ modulation Q signal is 1, and a signal of the sine carrier is inverted when the one bit ΔΣ modulation Q signal is −1. The coded cosine carriers and coded sine carriers are added at circuit 66 and a digital orthogonal signal with an intermediate frequency is obtained.

Next, at D/A converter 67, the digital orthogonal signal is converted into an analogue orthogonal signal, which is output to another apparatus via output terminal 29.

Since the modulator having the configuration described above does not need a multiplier for an orthogonal modulation even when an arbitrary sampling frequency is used, the volume of calculations can be significantly reduced.

Fifth embodiment

In the fifth embodiment of the present invention, an explanation will be given of a modulator for an orthogonal modulation which bit ΔΣ modulates a digital baseband signal after increasing its frequency to a desired sampling frequency, generates an address based on the bit ΔΣ modulation output value, accesses, using the address, a reading section in which the orthogonal modulation result is stored, and orthogonally modulates by reading the orthogonal modulation result corresponding to the access.

Figure 7:
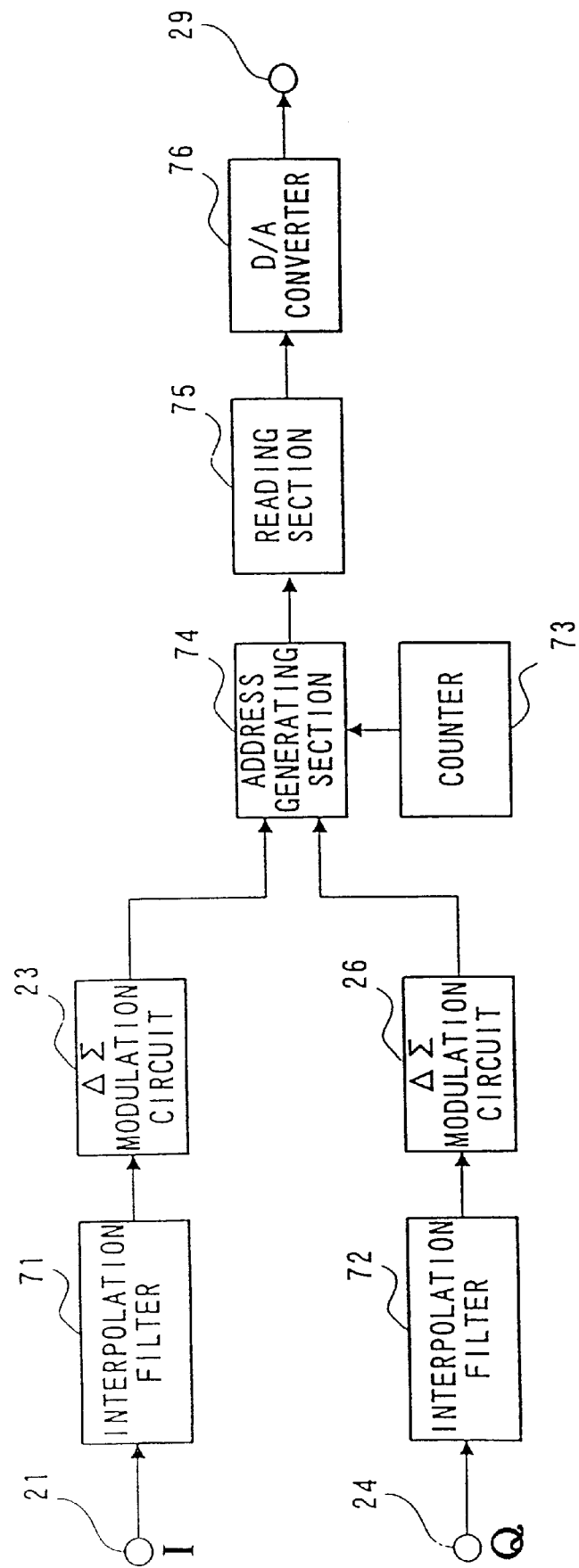
FIG. 7 is a block diagram illustrating a configuration of a modulator according to a fifth embodiment of the present invention.

FIG. 7 is a block diagram illustrating a configuration of a modulator according to the fifth embodiment of the present invention. In addition, parts common to the embodiment of FIG. 2 have the same symbols as in FIG. 2 and an explanation of these parts is omitted.

In FIG. 7, interpolation filter 71 increases the frequency of an I signal input from input terminal 21 to a desired sampling frequency fs. In a similar manner, interpolation filter 72 increases the frequency of an Q signal input from input terminal 24 to a desired sampling frequency fs. Counter 73 outputs pulse signals synchronized with outputs from bit ΔΣ modulation circuits 23 and 26, and outputs them to address generating section 74. Address generating section 74 generates an address corresponding to the input bit ΔΣ modulation circuit output, and accesses read section 75 using the address.

Read section 75 stores the orthogonal modulation results calculated in advance in an internal memory. For instance, in the case where each of the bit ΔΣ modulation outputs of I signal and Q signal is one bit, the orthogonal modulation results that should be output at each timing are four types shown in previously described relationships (11) to (14). Read section 75 stores the four types of the orthogonal modulation results in the order of relationships (11) to (14) in the internal memory. Based on the address accessed by address generating section 74, read section reads the orthogonal modulation result stored in the internal memory, and outputs the result as a digital orthogonal signal at an intermediate frequency to D/A converter 76.

D/A converter 76 converts the digital orthogonal signal into an analogue orthogonal signal, and outputs the converted analogue orthogonal signal to another apparatus via output terminal 29.

Next, a flow of operations at a modulator in the fifth embodiment of the present invention is explained.

First interpolation filter 71 increases the frequency of an I signal input to input terminal 21 and the signal is bit ΔΣ modulated at bit ΔΣ modulation circuit 23. In a similar manner, interpolation filter 72 increases the frequency of a Q signal input to input terminal 24 and the signal is bit ΔΣ modulated at modulation circuit 26.

Next, address generating section 74 generates an address synchronized with a pulse signal output from counter 73 based on the ΔΣ modulation outputs of the I signal and the Q signal. This address is used to access read section 75. The orthogonal modulation result corresponding to the address is read from read section 75, and the digital orthogonal signal with an intermediate frequency is obtained.

Next, at D/A converter 76, the digital orthogonal signal is converted into an analogue orthogonal signal, 20 which is outputted from an output terminal.

At the modulator having the configuration described above, even when the orthogonal modulation of the bit ΔΣ modulation signal is at an arbitrary sampling frequency, a multiplier is unnecessary when an orthogonal modulation is executed. The modulator does not require multibit summations and subtractions, compared to a modulator according to the fourth embodiment of the present invention, which allows further reductions in electric power consumed.

In addition, for each embodiment of the present invention as described above, the degree and output precision of bit ΔΣ modulator are not especially limited. Industrial applicability The present invention relates to a modulation apparatus and a modulation method for orthogonally modulating a baseband signal, which are appropriate for reducing the electric power consumed and useful in a digital mobile communication system and similar applications.

What is claimed is:

1. A modulation apparatus comprising:
    an interpolation filtering system that modulates center frequencies of an in-phase component and a quadrature phase component of a digital baseband signal to four times the frequency of an intermediate frequency;
    a ΔΣ modulation system that ΔΣ modulates the frequency modulated in-phase and quadrature phase components;
    a removing system that removes unnecessary frequency components from the ΔΣ modulated in-phase and quadrature phase components; and
    a switching system that generates a digital orthogonal signal at the intermediate frequency from the ΔΣ modulated signals passed by the removing system.

2. The modulation apparatus according to claim 1, wherein said switching system produces, from the ΔΣ modulated signals passed by the removing system, a code inverted signal of the quadrature phase component and a code inverted signal of the in-phase component and selects successive signals according to an order of the in-phase component, the code inverted signal of the quadrature phase component, the code inverted signal of the in-phase component and the quadrature phase component at a sampling frequency that is four times the frequency of the intermediate frequency.

3. The modulation apparatus according to claim 1, wherein said removing system comprises low pass filters that allow only low frequency components of the ΔΣ modulated signals to pass.

4. The modulation apparatus according to claim 1, wherein said removing system includes delay circuits that delay the ΔΣ modulated in-phase component and the ΔΣ modulated quadrature phase component by one period of a sampling frequency, and an adder for adding the output components of said delay circuits to the ΔΣ modulated in-phase component and to the ΔΣ modulated quadrature phase component.

5. A modulation apparatus comprising:
    an interpolation filtering system that modulates center frequencies of an in-phase component and a quadrature phase component of a digital baseband signal to four times the frequency of an intermediate frequency;
    a ΔΣ modulation system that ΔΣ modulates the frequency converted in-phase and quadrature phase components;
    a delay circuit for delaying the ΔΣ modulated signals by one period of a sampling frequency;
    a first switching system that generates a first digital orthogonal signal at the intermediate frequency from the ΔΣ modulated signals;
    a second switching system that generates a second digital orthogonal signal at the intermediate frequency from the delayed ΔΣ modulated signals; and
    an adding system that adds said first digital orthogonal signal and second digital orthogonal signal.

6. The modulation apparatus according to claim 5, wherein said first switching system and said second switching system concurrently produce, from the ΔΣ modulated signals passed by the delay circuit, a code inverted signal of the quadrature component and a code inverted signal of the in-phase component and select a signal according to an order of the in-phase component, a code inverted signal of the quadrature phase component, a code inverted signal of the in-phase component and the quadrature phase component by a sampling frequency that is four times the frequency of the intermediate frequency.

7. A modulation apparatus comprising:
    a one bit ΔΣ modulation system that ΔΣ modulates an in-phase component and a quadrature phase component of a digital baseband signal at each bit;
    a carrier generating system that generates a cosine carrier and a sine carrier;
    a carrier converting system that converts said cosine carrier and said sine carrier based on codes of the one bit ΔΣ modulated signals; and
    a carrier adder for outputting a digital orthogonal signal by adding the converted cosine carrier and the converted sine carrier.

8. The modulation apparatus according to claim 7, wherein said carrier converting system outputs the cosine carrier when a code of the in-phase component of the digital baseband signal is positive, outputs a code inverted cosine carrier when a code of the in-phase component of the digital baseband signal is negative, outputs the sine carrier when a code of the quadrature phase component of the digital baseband signal is positive, and outputs a code inverted sine carrier when a code of the quadrature phase component of the digital baseband signal is negative.

9. A modulation apparatus comprising:
    a ΔΣ system that ΔΣ modulates an in-phase component and a quadrature phase component of a digital baseband signal;
    an address generating system that generates addresses corresponding to the ΔΣ modulated signals; and
    a reading system that reads out stored digital orthogonal signals in accordance with the generated addresses.

10. A modulation method comprising:
    interpolation filtering center frequencies of an in-phase component and a quadrature phase component of a digital baseband signal to four times a frequency of an intermediate frequency;
    ΔΣ modulating the frequency converted signals;
    removing unnecessary frequency components from the ΔΣ modulated signals; and
    generating a digital orthogonal signal at the intermediate frequency from the ΔΣ modulated signals from which the unnecessary frequency components were removed.

11. The modulation method according to claim 10, wherein generating the digital orthogonal signal comprises generating, from the ΔΣ modulated signals from which the unnecessary frequency components were removed, a code inverted signal of the quadrature phase component and a code inverted signal of the in-phase component; and selecting successively in order the in-phase component, the code inverted signal of the quadrature phase component, the code inverted signal of the in-phase component and the quadrature phase component by a sampling frequency that is four times the frequency of the intermediate frequency.

12. The modulation method according to claim 10, wherein in removing the unnecessary frequency component, the unnecessary frequency component of the $\Delta\Sigma$ modulated signals is removed with a low pass filter.

13. The modulation method according to claim 10, wherein in removing the unnecessary frequency component, the in-phase component of the $\Delta\Sigma$ modulated signal and the quadrature phase component of the $\Delta\Sigma$ modulated signal and one period of a sampling frequency delayed versions of the in-phase component and of the quadrature phase component are added.

14. A modulation method comprising:

interpolation filtering center frequencies of an in-phase component and a quadrature phase component of a digital baseband signal to four times the frequency of an intermediate frequency;

$\Delta\Sigma$ modulating the frequency modulated in-phase and quadrature phase components;

removing an unnecessary frequency component from the $\Delta\Sigma$ modulated in-phase and quadrature phase components;

delaying the $\Delta\Sigma$ modulated signals by one period of a sampling frequency;

generating a first digital orthogonal signal with an intermediate frequency from the $\Delta\Sigma$ modulated signals;

generating a second digital orthogonal signal with the intermediate frequency from the one period of a sampling frequency delayed signals; and adding the first digital orthogonal signal and the second digital orthogonal signal.

15. The modulation method according to claim 14, wherein in generating the first digital orthogonal signal and in generating the second digital orthogonal signal, the in-phase component, a code inverted signal of the quadrature phase component, a code inverted signal of the in-phase component and the quadrature phase component of the digital baseband signal are selected concurrently according to the order of the signals by a sampling frequency that is four times the frequency of the intermediate frequency.

16. A modulation method comprising:

$\Delta\Sigma$ modulating an in-phase component and a quadrature phase component of a digital baseband signal at each bit;

generating a cosine carrier and a sine carrier;

converting the cosine carrier and the sine carrier based on a code of the one bit $\Delta\Sigma$ modulated in-phase and quadrature phase components; and outputting a digital orthogonal signal by adding the converted cosine carrier and the converted sine carrier.

17. The modulation method according to claim 16, wherein in converting the cosine carrier and the sine carrier, a conversion is executed by outputting the cosine carrier when a code of the in-phase component is positive, outputting a code inverted cosine carrier when a code of the in-phase component is negative, outputting the sine carrier when a code of the quadrature phase component of the digital baseband signal is positive, and outputting a code inverted sine carrier when a code of the quadrature phase component of the digital baseband signal is negative.

18. A modulation method comprising:

$\Delta\Sigma$ modulating an in-phase component and a quadrature phase component of a digital baseband signal;

generating an address corresponding to a value of the $\Delta\Sigma$ modulated in-phase and quadrature phase components; and outputting a stored digital orthogonal signal based on said address.

\* \* \* \* \*

UNITED STATES PATENT AND TRADEMARK OFFICE
CERTIFICATE OF CORRECTION

PATENT NO.   : 6,097,259
DATED        : August 1, 2000
INVENTOR(S)  : Y. SAITO et al.

It is certified that error appears in the above-identified patent and that said Letters Patent is hereby corrected as shown below:

On the cover of the printed patent, Item [73], Assignee, has been omitted and should be included as follows:

---Matsushita Electric Industrial Co., Ltd., Osaka, Japan---.

Signed and Sealed this

Twenty-fourth Day of April, 2001

*Attest:*

NICHOLAS P. GODICI

*Attesting Officer*   *Acting Director of the United States Patent and Trademark Office*